(12) United States Patent
Bell et al.

(10) Patent No.: US 11,269,152 B2
(45) Date of Patent: Mar. 8, 2022

(54) STRUCTURED FIBER OPTIC CABLING SYSTEM INCLUDING ADAPTER MODULES AND ORTHOGONALLY ARRANGED JUMPER ASSEMBLIES

(71) Applicant: CORNING RESEARCH & DEVELOPMENT CORPORATION, Corning, NY (US)

(72) Inventors: Michael Alan Bell, Newton, NC (US); Eric Raymond Logan, Huntersville, NC (US); Claudio Mazzali, Painted Post, NY (US); Brian Keith Rhoney, Denver, NC (US); Sergey Yurevich Ten, Corning, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/020,105

(22) Filed: Sep. 14, 2020

(65) Prior Publication Data

US 2021/0080671 A1    Mar. 18, 2021

Related U.S. Application Data

(60) Provisional application No. 62/902,127, filed on Sep. 18, 2019.

(51) Int. Cl.
*G02B 6/44*    (2006.01)

(52) U.S. Cl.
CPC ......... *G02B 6/4471* (2013.01); *G02B 6/4453* (2013.01)

(58) Field of Classification Search
CPC .................................................. G02B 6/4453
See application file for complete search history.

(56) References Cited

U.S. PATENT DOCUMENTS

| 5,185,824 A | 2/1993 | Grimes et al. |
| 6,728,461 B1 | 4/2004 | Senatore et al. |
| 7,092,592 B2 | 8/2006 | Verhagen et al. |
| 7,450,795 B2 | 11/2008 | Lin |

(Continued)

FOREIGN PATENT DOCUMENTS

WO    2003/046627 A1    6/2003

OTHER PUBLICATIONS

European Patent Application No. 20196976.3, Extended European Search Report dated Feb. 12, 2021; 6 pages; European Patent Office.

(Continued)

*Primary Examiner* — Sung H Pak
(74) *Attorney, Agent, or Firm* — Adam R. Weeks

(57) ABSTRACT

A structured optical fiber cabling system configured to connect first and second layers of switches in a mesh network is disclosed. The system comprises a plurality of fiber optic modules each including a plurality of first fiber optic ports distributed in a vertical direction when the fiber optic modules are installed in a chassis. A plurality of fiber optic jumper assemblies each include a horizontal segment and a plurality of legs and fiber optic connectors extending from the horizontal segment, with each fiber optic connector configured to connect to a corresponding fiber optic port of the plurality of first fiber optic ports at the same vertical location in each fiber optic module.

20 Claims, 15 Drawing Sheets

(56) References Cited

U.S. PATENT DOCUMENTS

| | | | |
|---|---|---|---|
| 8,103,137 B2 * | 1/2012 | Kirkpatrick | H04Q 11/0005 |
| | | | 385/17 |
| 8,768,116 B2 | 7/2014 | Mccolloch et al. | |
| 9,154,860 B2 * | 10/2015 | Hessong | H04Q 11/0062 |
| 10,107,973 B2 | 10/2018 | Sano et al. | |
| 10,302,877 B2 | 5/2019 | Sano et al. | |
| 2002/0023184 A1 | 2/2002 | Paul | |
| 2003/0185491 A1 | 10/2003 | Lacey et al. | |
| 2016/0313524 A1 | 10/2016 | Carter et al. | |
| 2017/0293092 A1 | 10/2017 | Sano et al. | |
| 2017/0293093 A1 | 10/2017 | Sano et al. | |
| 2018/0095227 A1 | 4/2018 | Hall | |
| 2018/0156981 A1 | 6/2018 | Murray et al. | |
| 2019/0212515 A1 | 7/2019 | Zhang et al. | |
| 2021/0072476 A1 * | 3/2021 | Reagan | H04Q 1/114 |

OTHER PUBLICATIONS

Borne et al, "High-Capacity Data Center Interconnects", SC461, Juniper Networks, Mar. 2018, 94 pages.

Robinson, Anthony, "Blockchain & the Cloud: Transforming Data Center Architecture for Tomorrow", Corning (dotmagazine), 6 pages, Date Unknown.

\* cited by examiner

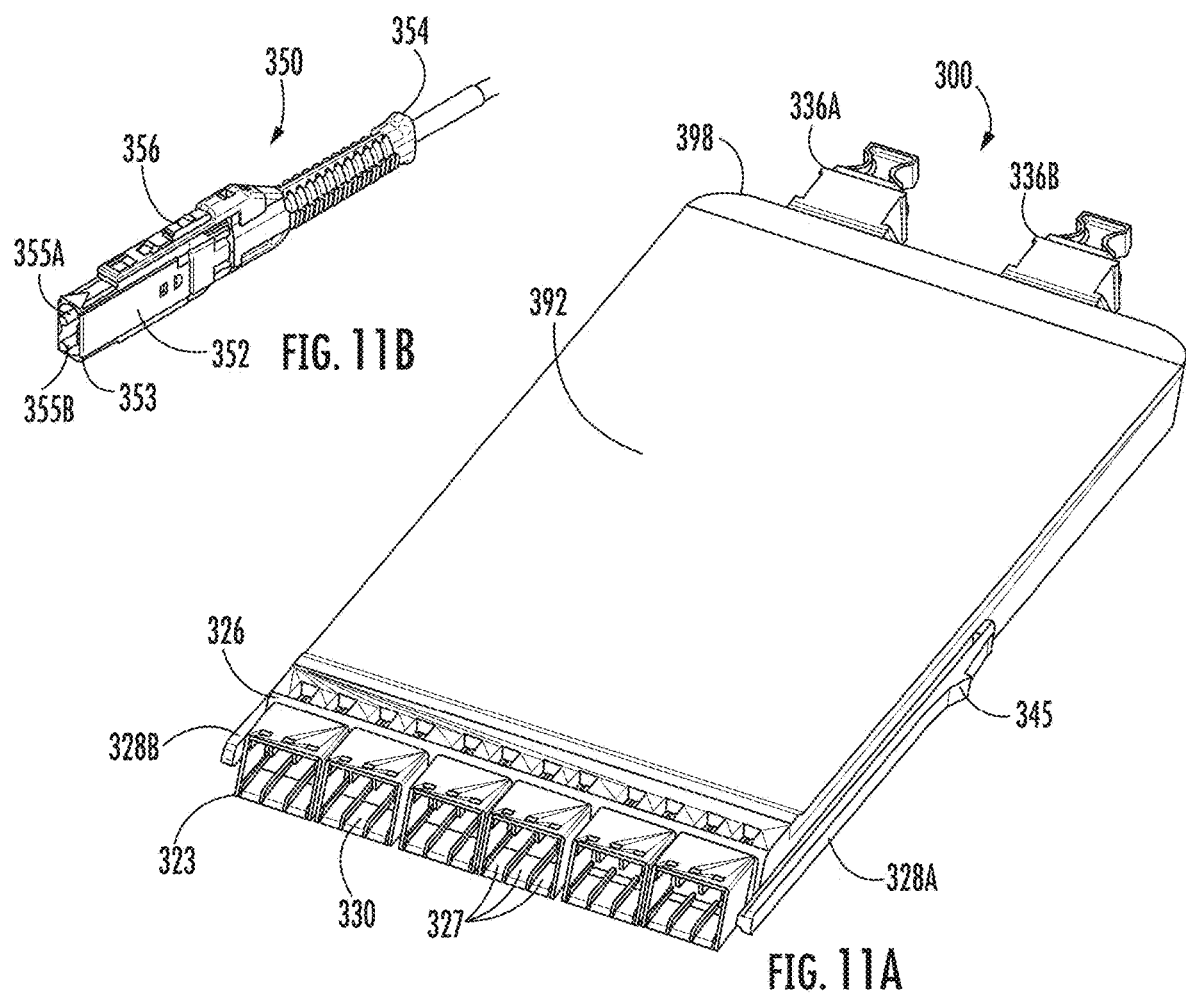
FIG. 11B
FIG. 11A
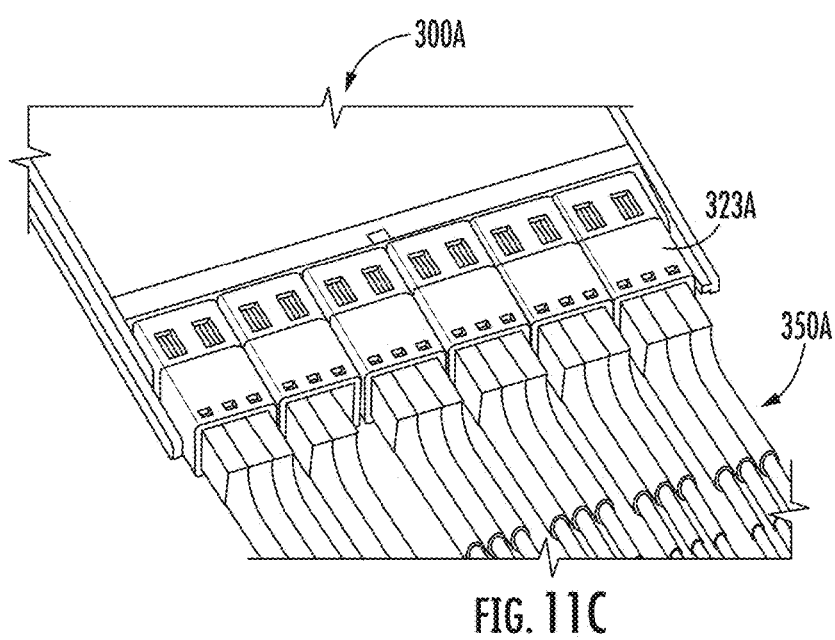
FIG. 11C

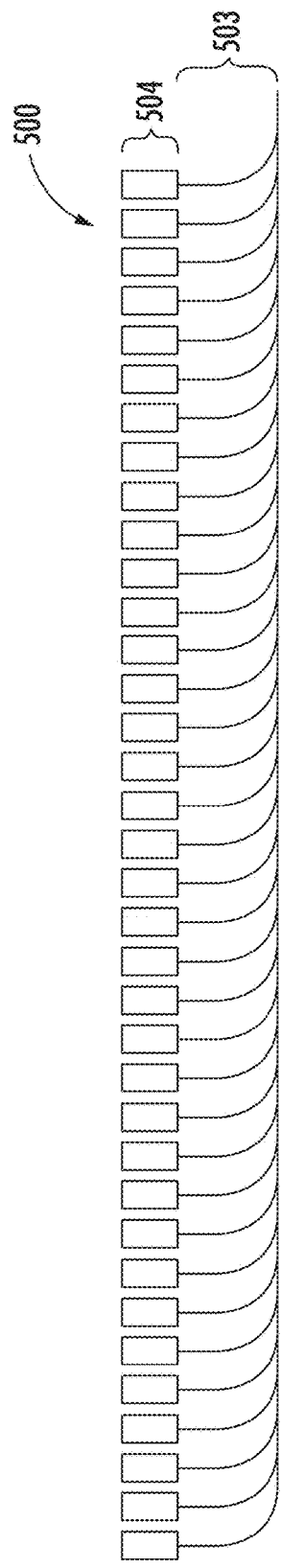
FIG. 15
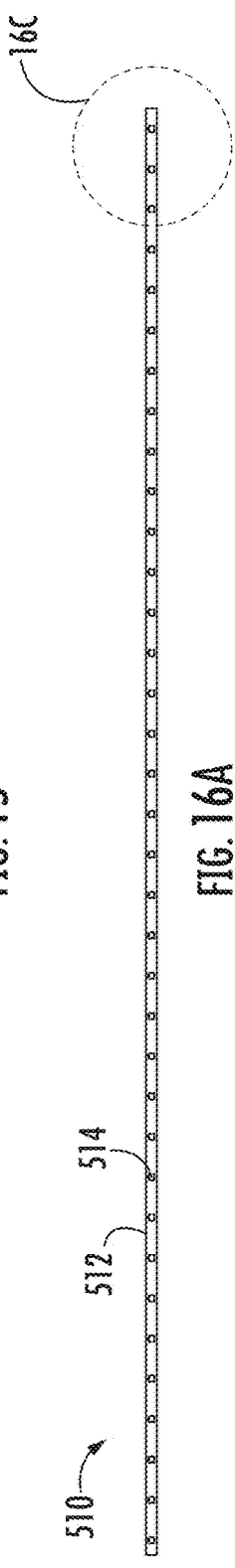
FIG. 16A
FIG. 16B
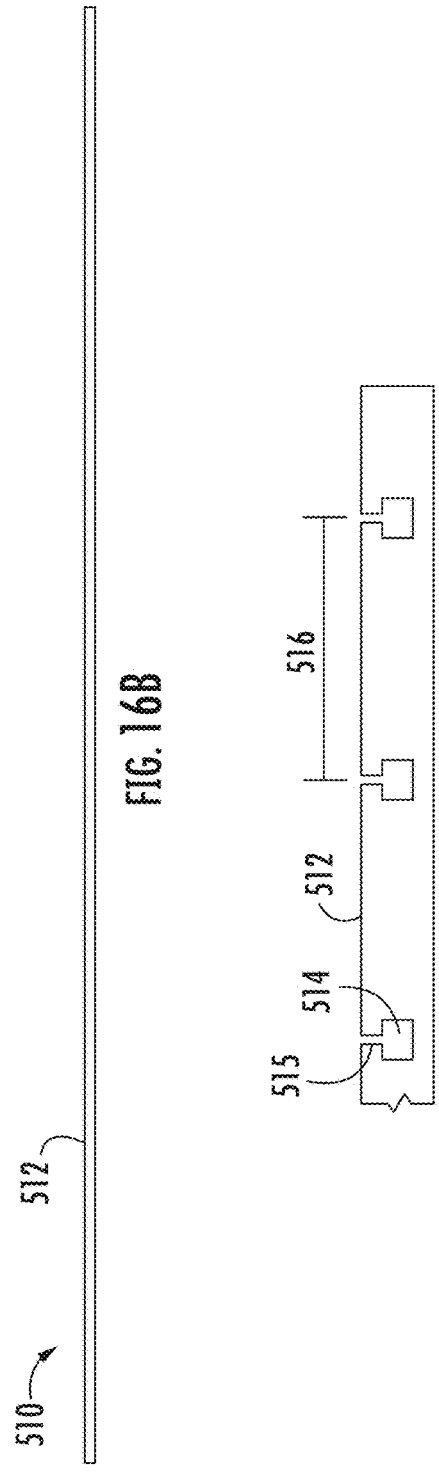
FIG. 16C

STRUCTURED FIBER OPTIC CABLING SYSTEM INCLUDING ADAPTER MODULES AND ORTHOGONALLY ARRANGED JUMPER ASSEMBLIES

CROSS-REFERENCE TO RELATED APPLICATION(S)

This application claims benefit of U.S. Provisional Patent Application No. 62/902,127, filed on Sep. 18, 2019, wherein the entire disclosure of the foregoing application is hereby incorporated by reference herein.

BACKGROUND

The disclosure relates generally to structured fiber optic cabling systems for making optical cross connections and methods for fabricating such cabling systems, with particular applicability to structured fiber optic cabling systems between different layers of switches in an optical fiber mesh network.

Optical fibers are useful in a wide variety of applications, including the telecommunications industry for voice, video, and data transmission. In a telecommunications system that uses optical fibers, there are typically many locations where fiber optic cables (which carry the optical fibers) connect to equipment or other fiber optic cables.

FIG. 1 is a cross-sectional view of an exemplary coated optical fiber 100 that includes a glass core 102, glass cladding 104 surrounding the glass core 102, and a multi-layer polymer coating 110 (including an inner primary coating layer 106 and an outer secondary coating layer 108) surrounding the glass cladding 104. The inner primary coating layer 106 may be configured to act as a shock absorber to minimize attenuation caused by any microbending of the coated optical fiber 100. The outer secondary coating layer 108 may be configured to protect the inner primary coating layer 106 against mechanical damage, and to act as a barrier to lateral forces. The outer diameter of the coated optical fiber 100 may be about 200 μm, about 250 μm, or any other suitable value. Optionally, an ink layer (e.g., having a thickness of about 5 μm) may be arranged over the outer secondary coating layer 108 of the coated optical fiber 100 to color the fiber (e.g., as is commonly used in ribbonized fibers), or a coloring agent may be mixed with the coating material that forms the outer secondary coating layer 108. An additional covering (not shown), which may be embodied in a tight buffer layer or a loose tube (also known as a furcation tube or fanout tube), may be applied to the coated optical fiber 100 to provide additional protection and allow for easier handling, wherein a resulting buffered or furcated optical fiber typically has an outer diameter of about 900 μm.

FIG. 2 is a cross-sectional view of a conventional multi-fiber ribbon 112 including twelve optical fibers 114A-114L and a matrix 116 encapsulating the optical fibers 114A-114L. The optical fibers 114A-114L are substantially aligned with one another in a generally parallel configuration, preferably with an angular deviation of no more than one degree from true parallel at any position. Although twelve optical fibers 114A-114L are shown in the ribbon 112, it is to be appreciated that any suitable number of multiple fibers (but preferably at least four fibers) may be employed to form optical fiber ribbons suitable for a particular use.

Optical communication systems utilizing fiber optic cables are a substantial and fast-growing constituent of communication networks, due to the low signal losses and large transmission bandwidth inherent to optical fibers. Hyperscale data centers have emerged in recent years to support high bandwidth communications.

Hyperscale datacenters have been converging into leaf-spine architecture with low oversubscription (wherein oversubscription refers to the practice of connecting multiple devices to the same switch port to optimize switch port utilization). Low oversubscription is critical to support diverse applications such as social media, web searching, cloud services, and artificial intelligence/machine leaning/deep learning.

Leaf-spine network architecture is a two-layer network topology that is useful for datacenters that experience more east-west network traffic than north-south traffic. Leaf-spine networks utilize a leaf layer and a spine layer. The spine layer is made up of switches that perform routing, working as the network backbone. The leaf layer, which may occasionally be referred to as a "fabric layer," involves access switches that connect to endpoints. In leaf-spine architecture, every leaf switch is interconnected with every spine switch, permitting any server to communicate with any other server using no more than one interconnection switch path between any two leaf switches.

FIG. 3 shows an example of a non-blocking leaf-spine switch network 120 in a full mesh configuration, where each leaf switch 124 has a port connected to a port of each spine switch 122. In the particular implementation of FIG. 3, twelve spine switches 122 and twelve leaf switches 124 are provided, with each spine switch 122 and each leaf switch 124 having twelve ports, for a total of one hundred forty-four links that are provided by optical fibers 126. If each link includes a Small Form Pluggable (SFP) duplex fiber transceiver (having a dedicated transmit (TX) fiber and a dedicated receive (RX) fiber), then the number of optical fibers 126 connecting the spine switches 122 and leaf switches 124 would be increased to two hundred eighty-eight.

A base unit of mesh connectivity can be scaled to interconnect a larger number of switches, limited only by the port count of the switches. FIG. 4 shows a large number of spine switches 132 and leaf switches 134 that are organized in groups (e.g., spine switch groups 133A-133D and leaf switch groups 135A-135H, respectively) providing a super-mesh switch network configuration 130, with a multitude of optical fiber jumpers 136 providing full mesh connectivity between all the spine switches 132 and leaf switches 134. In this example, ninety-six leaf switches 134 are connectible to forty-eight spine switches 132 in a full mesh network using thirty-two base units of mesh connectivity, with each base unit having one hundred forty-four links. As will be apparent, any suitable number of switches can be chosen as the base unit in leaf-spine networks providing full mesh connectivity.

In typical practice, spine switches and leaf switches are physically located in different areas of a datacenter building. Structured cabling is essential to fiber management. Traditional straight trunk cables may be used to bring the fibers close to the spine switches, and then subunits are broken out to connect to individual switch ports. FIG. 5 is a schematic diagram showing a conventional leaf-spine switch network 140 having twelve spine switches 142 and twelve leaf switches 144 that are connected in a mesh configuration using optical cabling 145, with each leaf switch 144 having a port connected to a port of each spine switch 142. Starting from the leaf switches 144, multi-fiber subunits 146 are collected into a trunk segment 147 (typically including a jacket 147A) that spans a majority of a distance between the leaf switches 144 and the spine switches 142. Multi-fiber subunits 148 are broken out from an end of the trunk segment 147 closest to the spine switches 142, and thereafter individual fiber segments 149 are broken out separately from each multi-fiber subunit 148 to connect to a port of each respective spine switch 142. FIG. 5 shows that switch panels (e.g., including spine switches 142) for mesh networks remain highly chaotic and unmanageable. Individual optical fibers are actually harder to trace than would be suggested by FIG. 5, since such figure illustrates just one mesh connection unit, whereas in practice a multitude of mesh connection units would be provided in a typical leaf-spine network.

To enhance manageability and traceability of optical fibers in mesh network switch panels, one solution is to insert an optical shuffle box between a trunk cable and spine switch to provide a full mesh cross-connector pattern. An example of such a solution is shown in FIG. 6, which illustrates a leaf-spine switch network 150 that includes a trunk cable 155, an optical shuffle box 160, and jumpers 166A-166L arranged in a mesh configuration between twelve leaf switches 154 and twelve spine switches 152, with each leaf switch 154 having a port connected to a port of each spine switch 152. The trunk cable 155 includes a trunk segment 157 within a jacket 157A, and first and second groups of tubes 156, 158 (also known as fanout tubes). The optical shuffle box 160 includes a housing 161 that contains ports 162A-162L and ports 164A-164L. Multiple optical fiber connections 163 are provided within the optical shuffle box 160. Use of the optical shuffle box 160 to connect with the spine switches 152 entails use of a small number of simple multi-fiber jumper cables relative to the much larger number of single-fiber connections that would be required in the absence of an optical shuffle box (as shown in FIG. 5), thereby enabling a well-organized fiber layout at a switch rack supporting the spine switches 152. Within an optical shuffle box 160, distances between the ports 162A-162L and ports 164A-164L are typically substantially less than one meter.

Utilization of an optical shuffle box adds two multi-fiber connections (e.g., through each pair of serially arranged ports 162A to 164A through 162L to 164L) for each link, which can increase cost and has the potential to increase optical insertion loss. Additionally, the large number of connection points per link can present challenges in terms of testing the network system following installation of equipment. Optical shuffle boxes also entail significant cost and consume valuable space inside equipment racks.

Another limitation associated with optical shuffle boxes is that they do not readily accommodate reconfiguration or expansion of switching arrangements within or between datacenters.

In view of the foregoing, need remains in the art for structured fiber optic cabling systems that address the above-described and other limitations associated with conventional connectivity solutions (e.g., for leaf-spine networking in datacenters), as well as associated fabrication methods.

SUMMARY

Aspects of the present disclosure provide a structured optical fiber cabling system configured to connect first and second layers of switches in a mesh network utilizing a plurality of fiber optic modules each including a plurality of first fiber optic ports distributed in a vertical direction when the fiber optic modules are installed in a chassis, and utilizing a plurality of fiber optic jumper assemblies each including a horizontal segment and a plurality of legs and connectors extending from the horizontal segment, with each connector configured to connect to a corresponding fiber optic port of the plurality of first fiber optic ports at the same vertical location in each fiber optic module. By arranging the modules in a two dimensional array with corresponding first fiber optic ports of each module arranged at the same height (i.e., along a common horizontal plane), and utilizing fiber optic jumper assemblies extending orthogonally to the modules, optical fiber cable connections between different layers of switches (e.g., spine switches and leaf switches (a/k/a fabric switches)) in a mesh network may be simplified without the need for using optical fiber shuffle boxes.

In one embodiment of the disclosure, a structured fiber optic cabling system configured to connect first and second layers of switches in a mesh network comprises a chassis, a plurality of fiber optic modules configured to be installed in the chassis in a side-by-side configuration, and a plurality of fiber optic jumper assemblies configured to connect the plurality of fiber optic modules to a plurality of second layer switches. Each fiber optic module of the plurality of fiber optic modules comprises a first location comprising a plurality of first fiber optic ports, a second location comprising at least one second fiber optic port, a main body defining an internal chamber between the first location and the second location, and a plurality of optical fibers disposed within the internal chamber and arranged to establish optical connections between the at least one second fiber optic port and the plurality of first fiber optic ports. For each fiber optic module, the plurality of first fiber optic ports are distributed in a vertical direction when the fiber optic module is installed in the chassis. Each fiber optic jumper assembly includes a segment extending in a horizontal direction proximate to the plurality of first fiber optic ports. Each fiber optic jumper assembly includes a plurality of legs extending from the segment to a plurality of fiber optic connectors, and each fiber optic connector of the plurality of fiber optic connectors is connected to a corresponding fiber optic port of the plurality of first fiber optic ports at the same vertical location in each fiber optic module of the plurality of fiber optic modules.

Additional features and advantages will be set forth in the detailed description that follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 11A is an upper perspective view of a second fiber optic module including six adapter blocks along a front side, each configured to receive three duplex MDC connectors, and including two MPO ports along a rear side.

FIG. 11B is a perspective view of a single duplex MDC connector.

FIG. 11C is a perspective view of a front portion of a fiber optic module substantially similar to the fiber optic module of FIG. 11A, with seventeen MDC connectors received by adapters along the front side of the fiber optic module.

FIG. 15 is a simplified top view of a portion of a fiber optic jumper assembly including a horizontal segment with thirty-six legs emanating from the horizontal segment and terminated by thirty-six connectors.

FIG. 16A is a front elevational view of a connector positioning guide member having a body and thirty-six apertures configured for use with the fiber optic jumper assembly of FIG. 15 to maintain positioning of the connectors of the fiber optic jumper assembly in linear order.

FIG. 16B is a top plan view of the connector positioning guide member of FIG. 16A.

FIG. 16C is a magnified front elevational view of a portion of the connector positioning guide member of FIG. 16A.

DETAILED DESCRIPTION

Aspects of the present disclosure provide a structured optical fiber cabling system configured to connect first and second layers of switches in a mesh network utilizing a plurality of fiber optic modules each including a plurality of first fiber optic ports distributed in a vertical direction when the fiber optic modules are installed in a chassis, and utilizing a plurality of fiber optic jumper assemblies each including a horizontal segment and a plurality of legs and fiber optic connectors extending from the horizontal segment, with each fiber optic connector configured to connect to a corresponding fiber optic port of the plurality of first fiber optic ports at the same vertical location in each fiber optic module.

The term "fiber optic connector" in this disclosure may be simplified to "connector" for convenience. The connectors may be any type of connector, although in certain instances it may be beneficial to use types of multi-fiber connectors, such as multi-fiber push-on/pull-off (MPO) connectors (e.g., according to IEC 61754-7), or small form factor (SFF) connectors in simplex or duplex configuration, such as LC connectors (e.g., according to IEC 61754-20). Recently, several very-small form factor (VSFF) connectors have been introduced for pluggable transceiver applications (e.g., QSFP-DD Multi Source Agreement), including MDC connectors offered by U.S. Conec, Ltd. (Hickory, N.C.), and SN connectors offered by Senko Advanced Components, Inc. (Marlborough, Mass.). Such VSFF connectors may be particularly useful for in the structured optical fiber cable systems in this disclosure, and will be referred to generically as "dual-ferrule VSFF connectors" due to their common design characteristic of having two single-fiber ferrules within a common housing. The MDC connector in particular is referenced below as an example connector in several embodiments. Again, however, other suitable connectors may also be used, as will be appreciated by persons skilled in optical connectivity.

To provide context for embodiments of the present disclosure, examples of datacenter architecture will be described in connection with FIGS. 7 and 8. Various embodiments of the present disclosure will be described thereafter.

Figure 1:
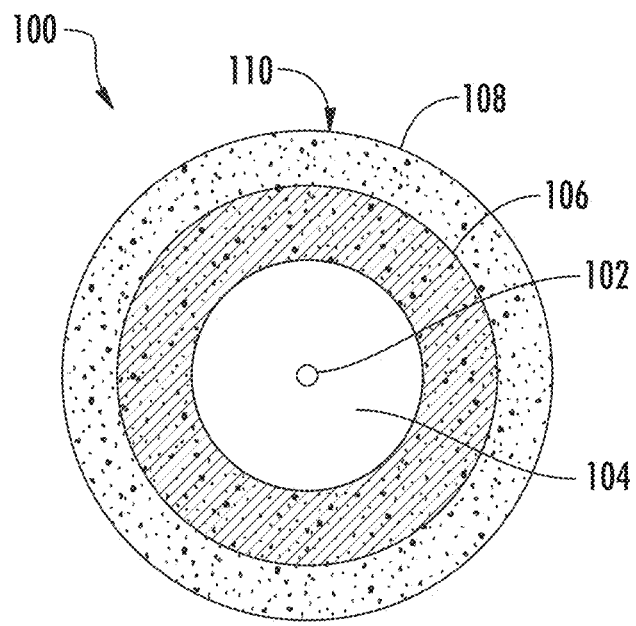
FIG. 1 is a cross-sectional view of a conventional coated optical fiber.
Figure 2:
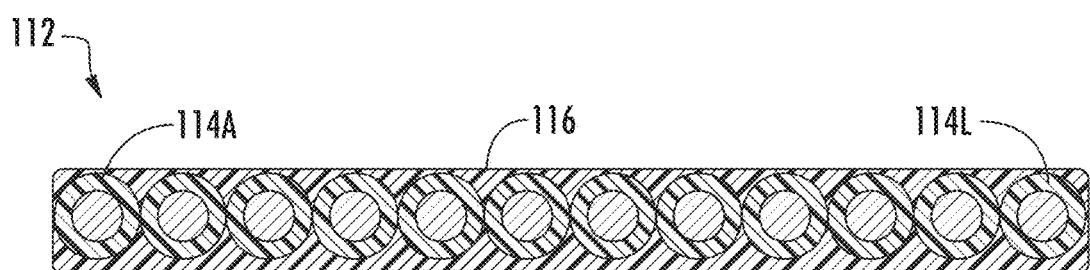
FIG. 2 is a cross-sectional view of a conventional multi-fiber ribbon including twelve optical fibers.
Figure 3:
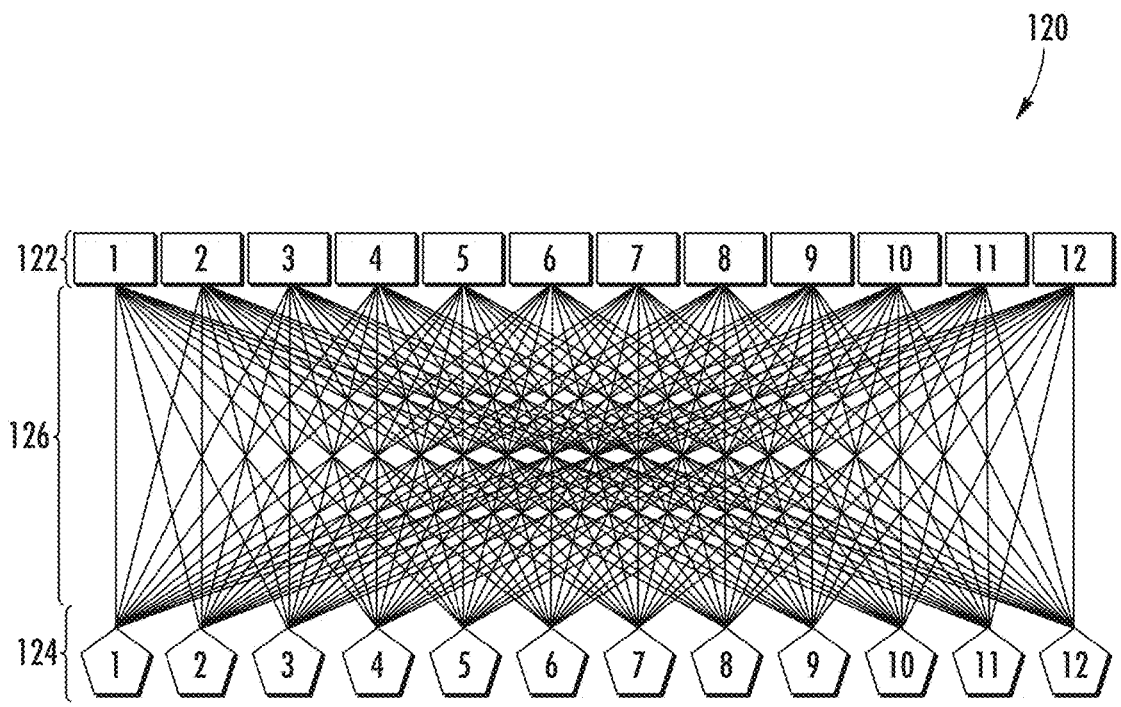
FIG. 3 is a schematic diagram showing a conventional, non-blocking leaf-spine switch network in a full mesh configuration, with each leaf switch having a port connected to a port of each spine switch.
Figure 4:
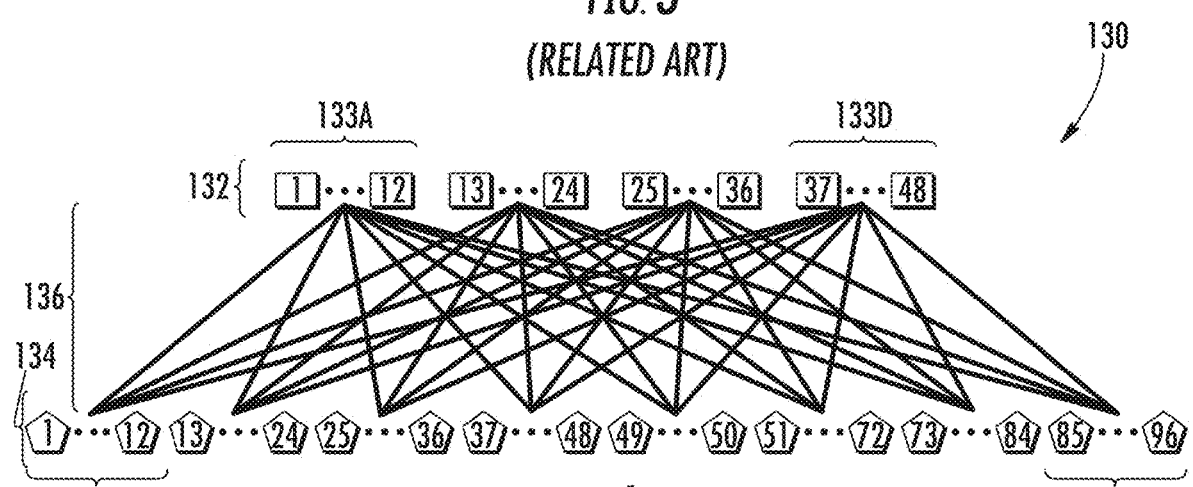
FIG. 4 is a schematic diagram showing a conventional super-mesh switch network configuration with ninety-six leaf switches being connected to forty-eight spine switches in a full mesh network using thirty-two base units of mesh connectivity.
Figure 5:
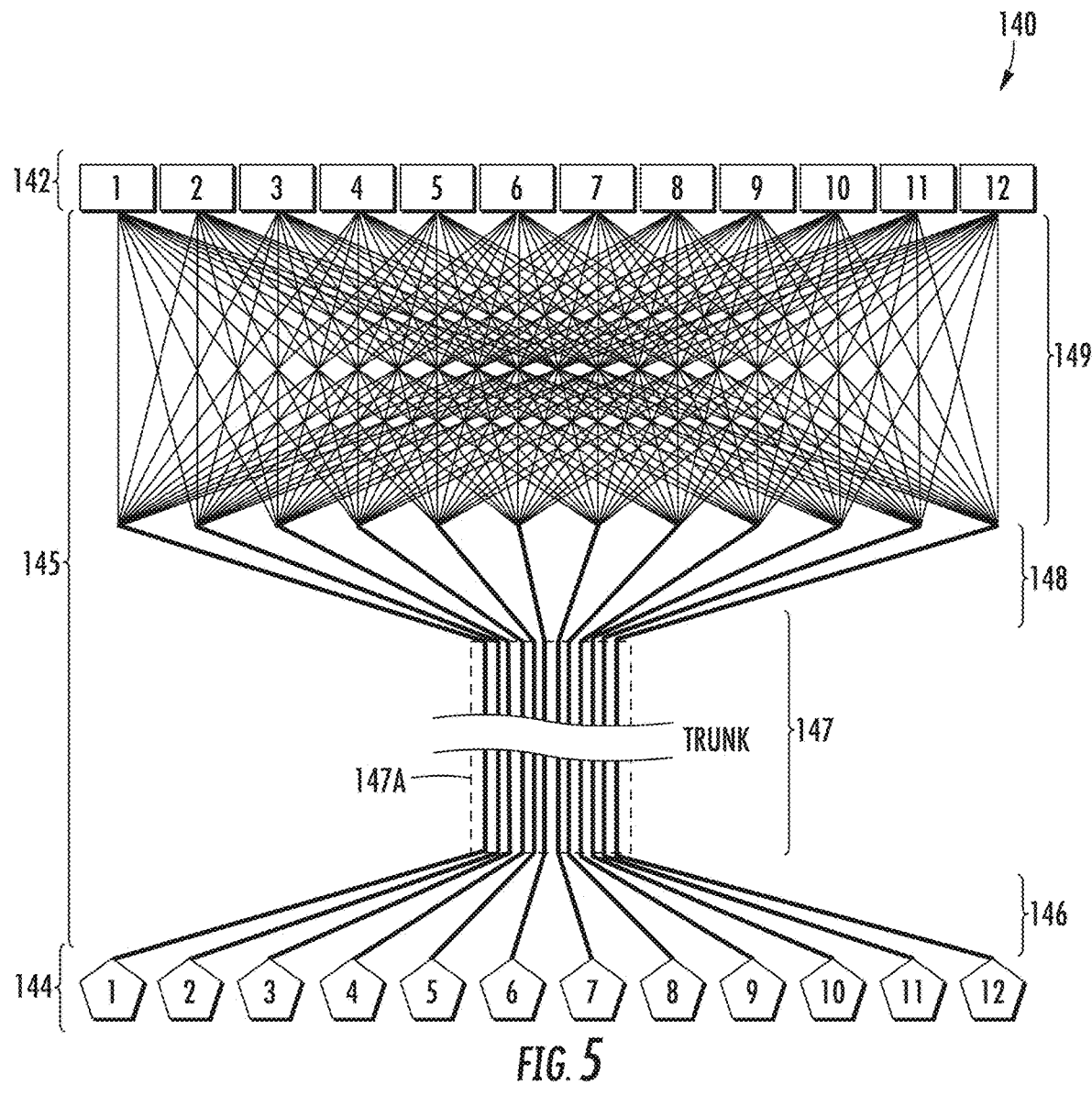
FIG. 5 is a schematic diagram showing a conventional leaf-spine switch network including a trunk segment having twelve groups of twelve optical fibers arranged in a mesh configuration between twelve leaf switches and twelve spine switches, with each leaf switch having a port connected to a port of each spine switch.
Figure 6:
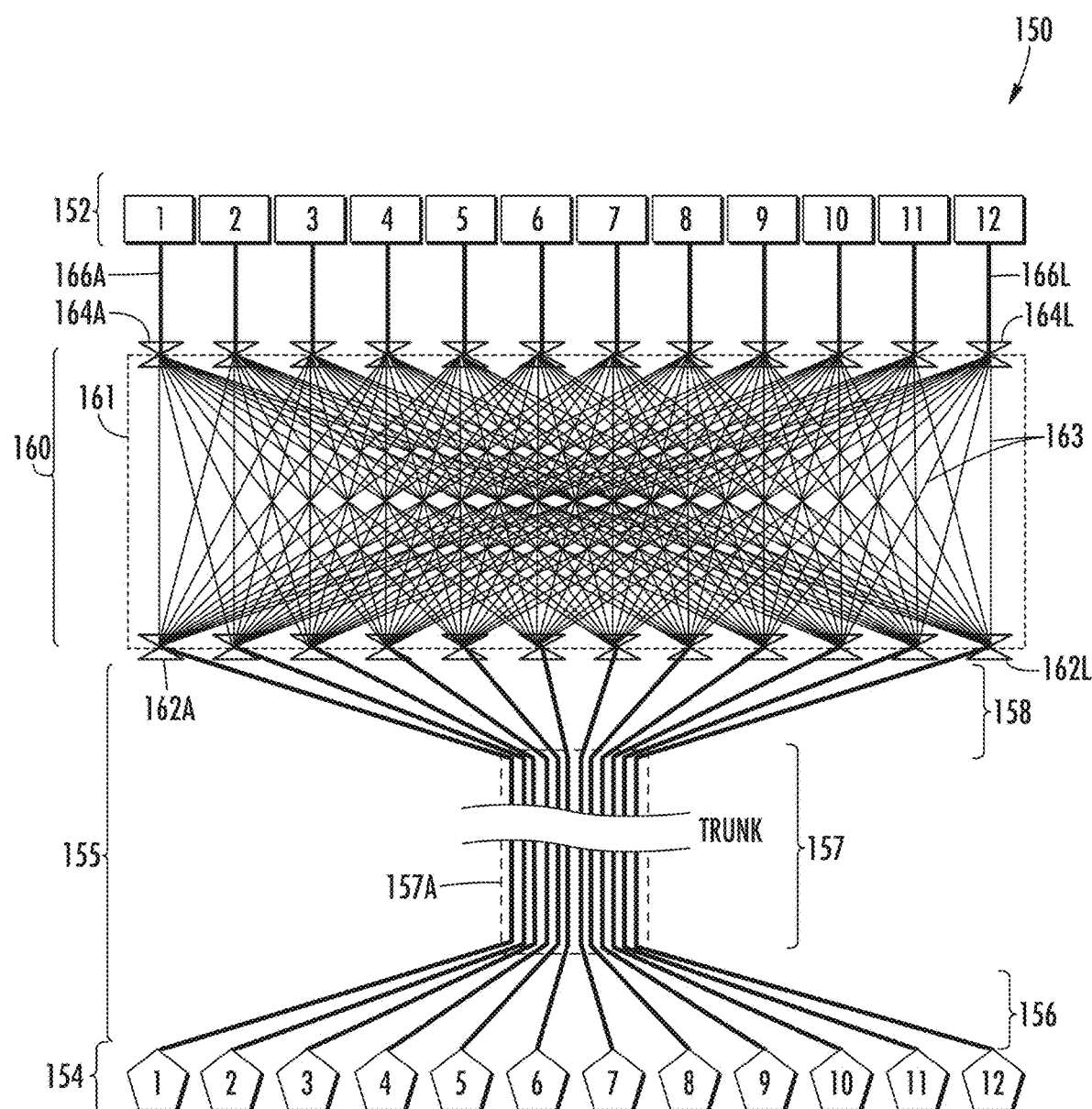
FIG. 6 is a schematic diagram showing a conventional leaf-spine switch network including a trunk cable and an optical shuffle box arranged in a mesh configuration between twelve leaf switches and twelve spine switches, with each leaf switch having a port connected to a port of each spine switch.
Figure 7:
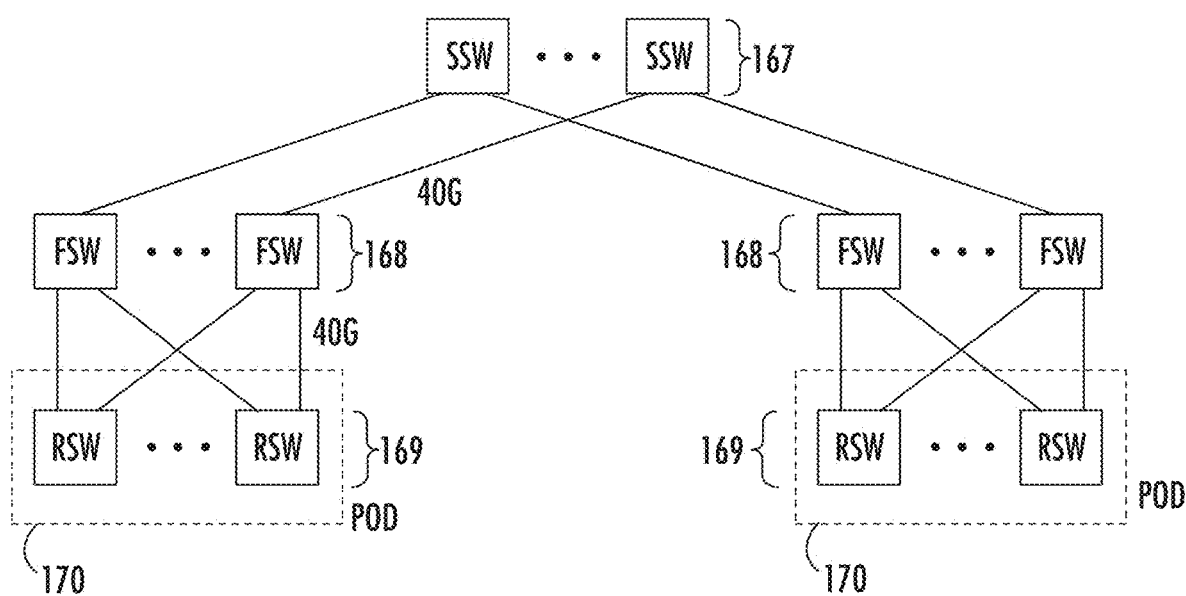
FIG. 7 is a first schematic diagram showing an example of a datacenter network architecture including spine switches (SSW), fabric switches (FSW), and rack switches (RSW).

FIG. 7 is a schematic diagram showing one example of a datacenter network architecture including spine switches (SSW) 167, fabric switches (FSW) 168, and rack switches (RSW) 169, with mesh connections between the spine switches 167 and the fabric switches 168, and with mesh connections between the fabric switches 168 and the rack switches 169. The rack switches 169 may be organized into pods 170 that may be deployed incrementally as a datacenter is built out. Although only two spine switches 167, four fabric switches 168, and four rack switches 169 are shown, it is to be appreciated that any suitable numbers of switches 167-169 of the three types may be provided.

Figure 8:
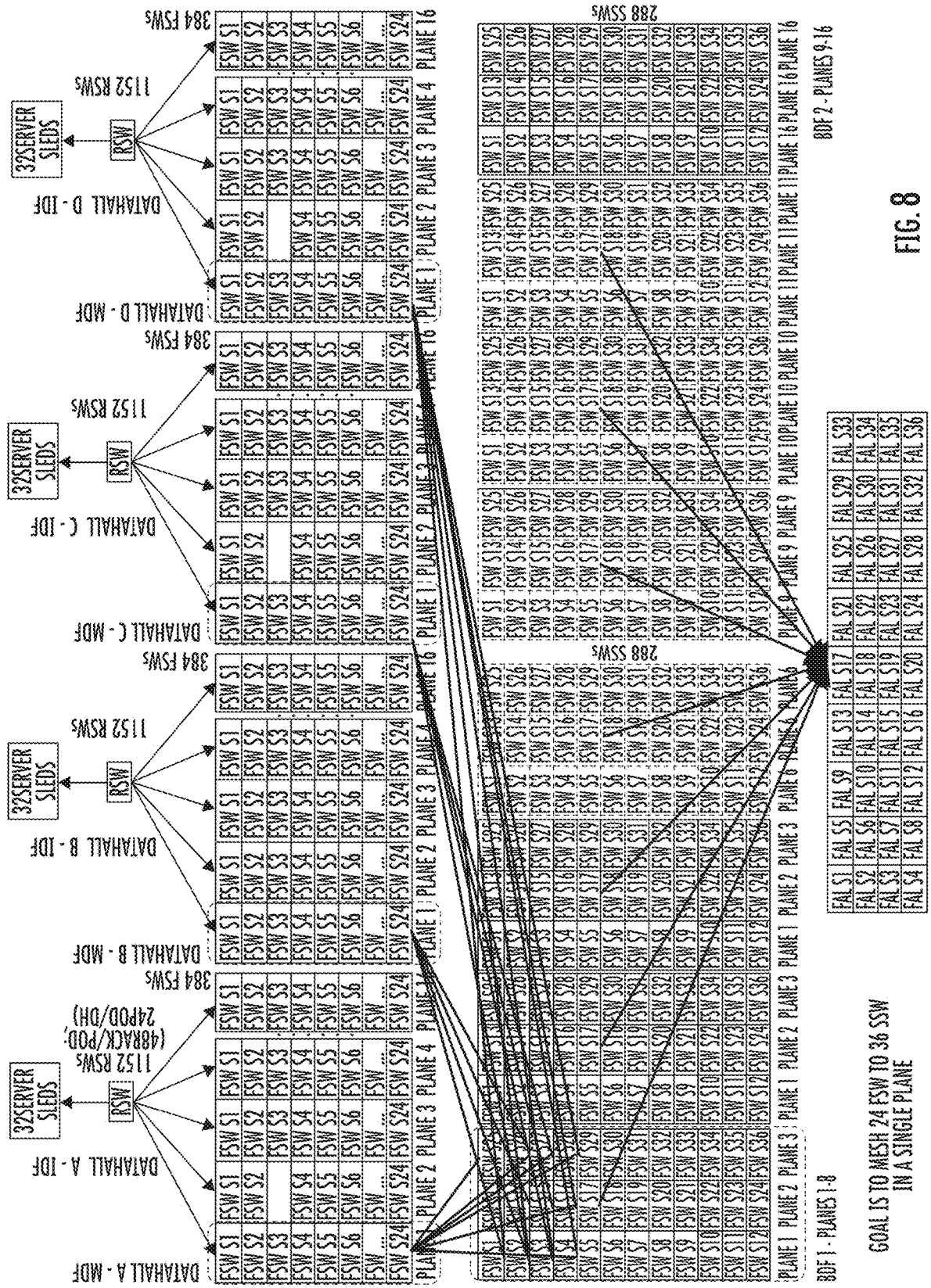
FIG. 8 is a second schematic diagram showing an example of a datacenter network architecture including two multiple building distribution frames containing a total of 16 planes of spine switches (with 36 spine switches per plane), and multiple datahalls each including 16 planes of fabric switches (with 24 fabric switches per plane), with mesh connections between corresponding planes of the fabric switches and leaf switches provided by optical fibers.

FIG. 8 is a second schematic diagram showing an example of a datacenter network architecture including two multiple building distribution frames (MDFs) each containing eight planes of SSWs (totaling 16 planes, with 36 spine switches per plane), and multiple datahalls each including 16 planes of FSWs (with 24 FSWs per plane), with mesh connections between corresponding planes of the FSWs and SSWs provided by optical fibers. FIG. 8 further illustrates RSWs arranged between the FSWs and servers (e.g., arranged as 32-server sleds). For each datahall, it is intended for each FSW in the first plane (including FSW S1 to FSW S24) to be connected by an optical fiber pair to each SSW (including SSW S1 to SSW S36). Various optical interconnections (illustrated as diagonal lines) are shown as being made between SSWs of the first plane and FSWs of the first plane, without illustrating the full mesh interconnection for ease of illustration (since illustrating all optical connections would obscure the entirety of the SSWs and FSWs). Many thousands of optical fiber connections are required to complete the mesh interconnection between the SSWs and FSWs.

One method for simplifying cable connections between FSWs and SSWs is to utilize optic fiber shuffle boxes that permit trunk cables (with large numbers of fibers) to span between different 'boxes' (e.g., switch racks), thereby reducing the number of cables to be pulled within a facility, relative to the use of two-fiber patch cords or jumpers for making connections. For example, a multi-fiber trunk cable may be provided between a module box (arranged downstream of an optical fiber shuffle box, not shown) and a single fabric switch. Benefits of using optical fiber shuffle boxes with trunk cables include easier patching, ease of fitting shuffle boxes into standard 19-inch (or 23-inch) width racks, and scalability by addition of further shuffle boxes. Drawbacks include the potential increase of optical connector losses, testing challenges, and the inability to re-use shuffle boxes if the network architecture should need to be reconfigured in the future.

To avoid the use of optical fiber shuffle boxes, one potential alternative would be to provide one or more high-density trunk cables (e.g., multi-fiber push-on (MPO) connectors at both ends) between a SSW and a module box (MBOX), and then provide patch cords (each having one optical fiber pair) between the module box and the fabric switches. Avoiding the use of optical fiber shuffle boxes involves less connectors in the optical links and the potential losses inherent to shuffle boxes, provides compatibility with standard 19-inch (or 23-inch) width racks, and enables future network reconfiguration. However, the proposed arrangement involves very complex patching schemes that lead to connection errors and lengthen installation times.

To address limitations associated with prior systems, structured fiber optic cabling systems for connecting first and second layers of switches in a mesh network according to certain embodiments will now be described.

Figure 9A:
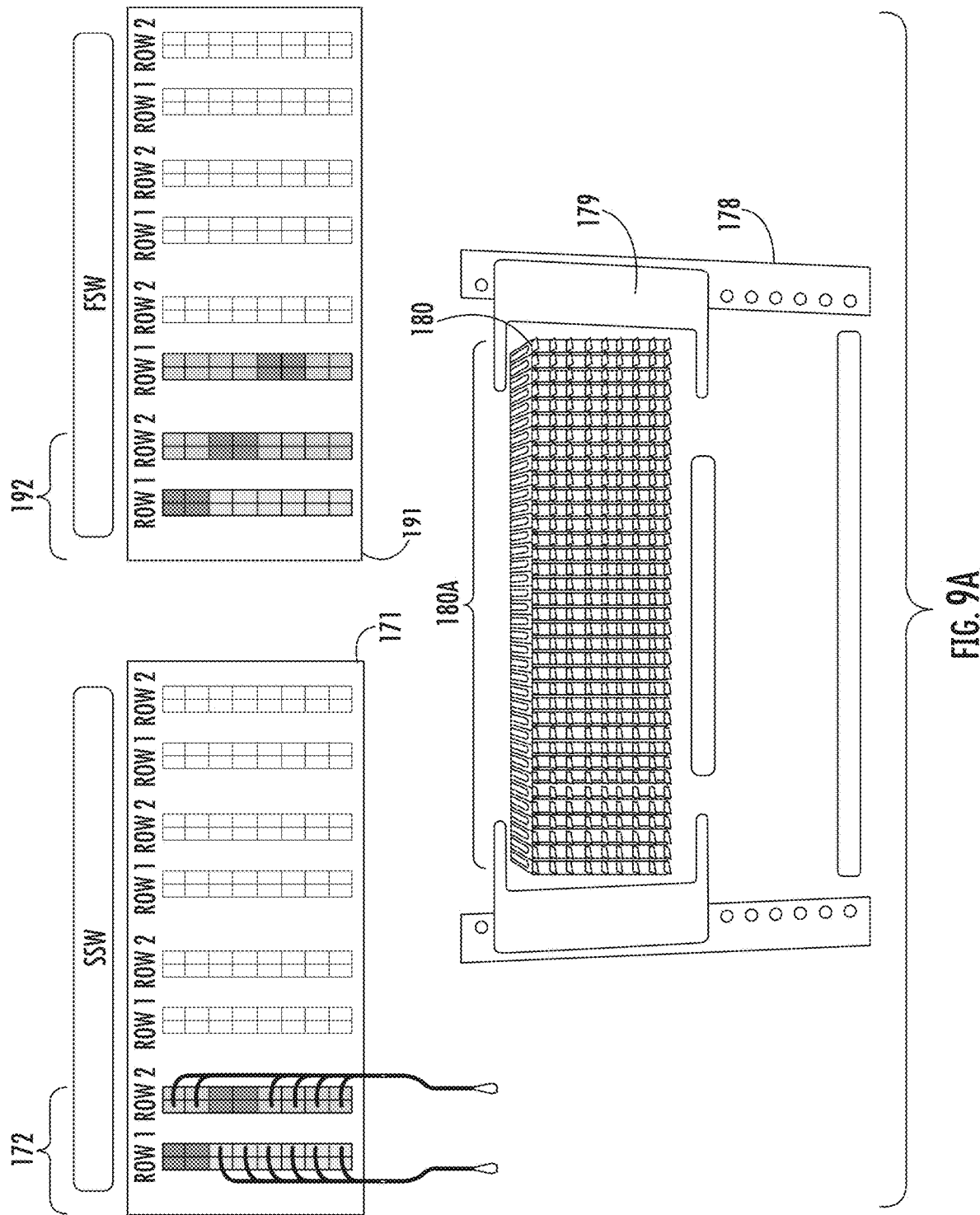
FIG. 9A illustrates a rack-mounted array of thirty-six fiber optic modules arranged vertically in a side-by-side configuration and each having first fiber optic ports distributed in a vertical direction, with the array of fiber optic modules arranged between a spine switch and a fabric switch.

FIG. 9A illustrates a spine switch 171 and a fabric switch (or leaf switch) 191 each having multiple fiber optic connection locations 172, 192, and an array 180A of thirty-six fiber optic modules 180 arranged to permit interconnection between the spine switch 171 and the leaf switch 191. The fiber optic modules 180 are received by a chassis 179 that is mounted to a fiber optic equipment rack 178. As shown, the fiber optic modules 180 are arranged vertically in a side-by-side configuration, with each fiber optic module 180 having first fiber optic ports distributed in a vertical direction and disposed along a front side of the fiber optic module 180. As shown, two breakout cables 173 (e.g., incorporating fanout or furcation bodies) may be coupled with fiber optic connection locations 172 of the spine switch 171. In certain embodiments, each breakout cable 173 may include twenty-four optical fibers and may include a MPO connector 174 configured to mate with a MPO connector of a trunk cable, as shown in FIG. 9B.

Figure 9B:
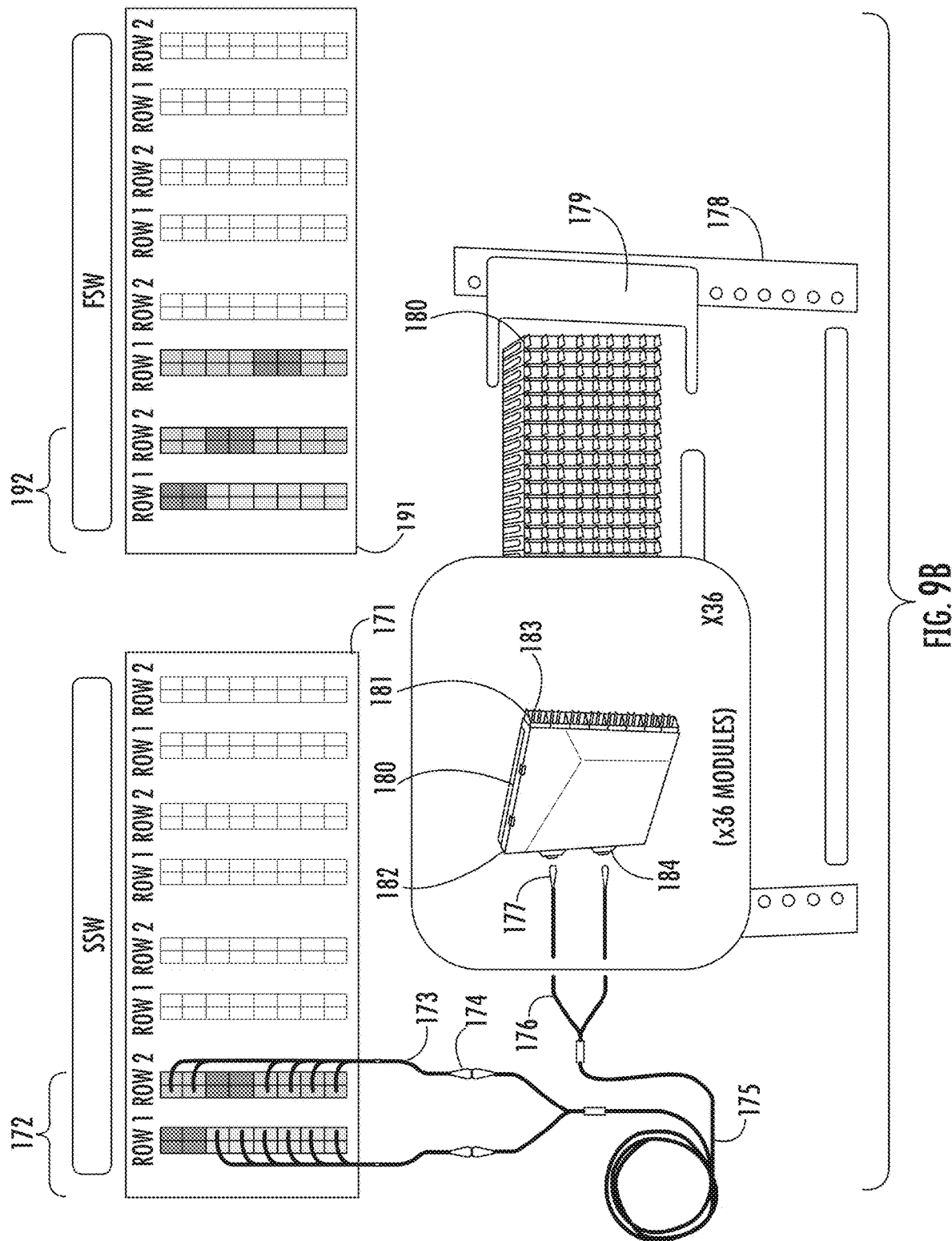
FIG. 9B illustrates the components of FIG. 9A with the addition of a magnified perspective view of one fiber optic module, and with a trunk cable extending part of the distance between the spine switch and the one fiber optic module.

FIG. 9B illustrates the components of FIG. 9A with the addition of a magnified perspective view of one fiber optic module 180, and with a trunk cable 175 extending part of the distance between the spine switch 171 and the one fiber optic module 180 to couple with a MPO connector 174 of each breakout cable 173. Along one end, the trunk cable 175 is split into two segments 176 (e.g., each having twenty-four pairs of optical fibers) each terminated with a MPO connector 177. The illustrated fiber optic module 180 includes a front side 181 having twenty-four duplex fiber optic ports 183 (e.g., MDC adapter ports) distributed in a vertical direction, and includes a rear side 182 having two MPO connector ports 184 arranged to receive the MPO connectors 177 of the trunk cable 175.

Figure 9C:
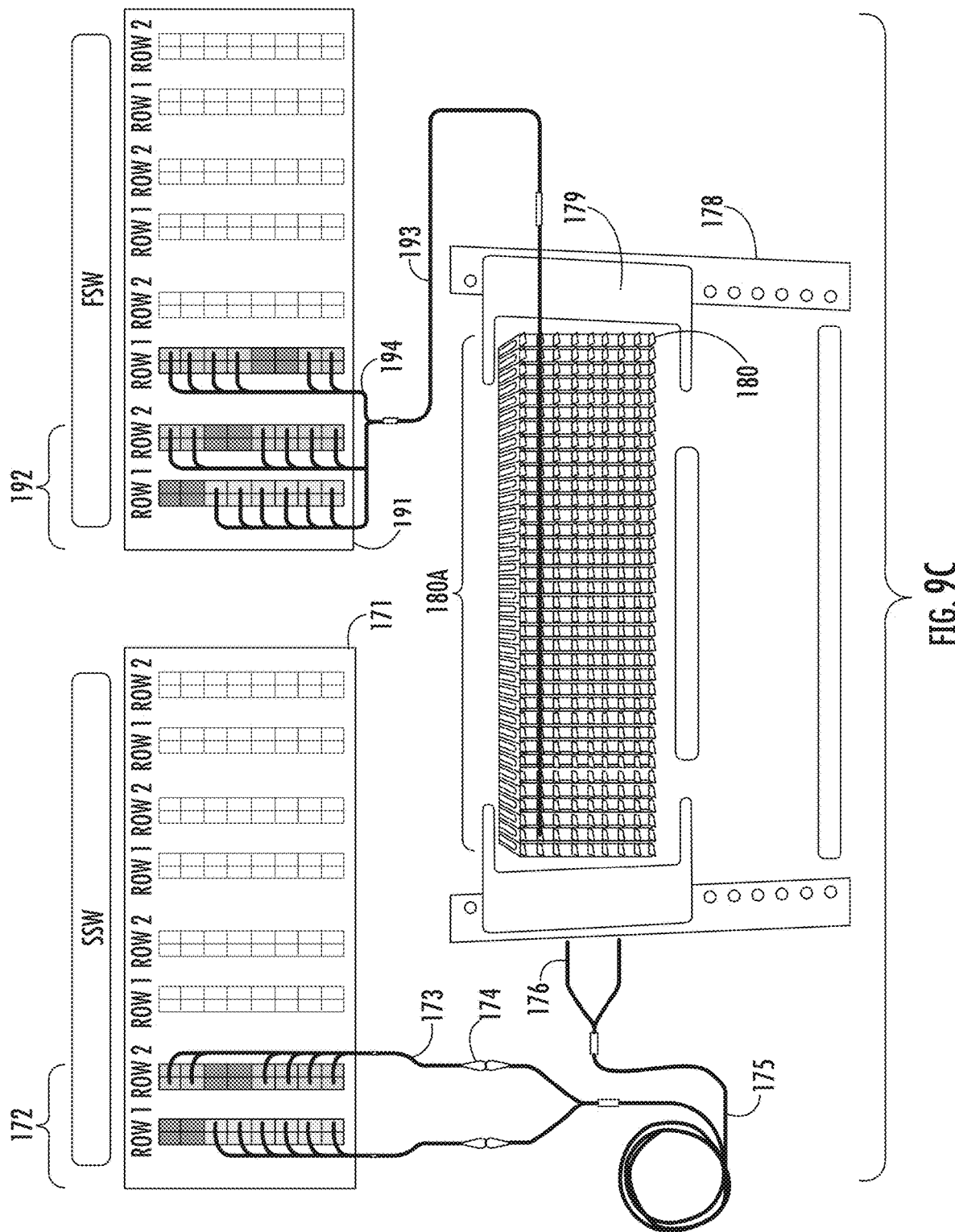
FIG. 9C illustrates the components of FIG. 9A with the addition of a fiber optic jumper assembly extending in a horizontal direction across a front of every fiber optic module of the array, and connectors of the fiber optic jumper assembly each connected to a corresponding fiber optic port of the plurality of fiber optic ports at the same vertical location in each fiber optic module of the array of fiber optic modules.

FIG. 9C illustrates the components of FIGS. 9A and 9B with addition of a fiber optic jumper assembly 193 having a segment 195 extending in a horizontal direction across a front of every fiber optic module 180 of the array 180A. The fiber optic jumper assembly 193 includes connectors each connected to a corresponding fiber optic port 183 at the same vertical location in each fiber optic module 180 of the array 180A of fiber optic modules. In this manner, the fiber optic jumper assembly 193 includes numerous pairs of optic fibers, with separate pairs of optical fibers coupled to each fiber optic module 180 at the same first optical fiber port location of each fiber optic module 180. The fiber optic jumper assembly 193 includes a bundled intermediate section and a breakout portion 194 including connectors coupled to connection locations 192 of the fabric switch 191.

In certain embodiments, the breakout portion 194 of each fiber optic jumper assembly 193 may include connectors pre-organized (e.g., temporarily or permanently retained) in a carrier to position the connectors in the linecard configuration of the connection locations 192 of the fabric switch, in order to reduce patching time and/or patching errors. Such a carrier may include a rigid or semi-rigid material such as thin plastic, laminated cardstock, paperboard, or the like. In certain embodiments, a carrier may be continuous in character or may embody webbing or open spaces akin to a carrier for a six-pack of canned beverages. In certain embodiments, a carrier may be rollable or collapsible in character to permit the carrier to be affixed to the breakout portion 194 and yet still be cable of being pulled through cable passages such as cable trays, conduit, or the like. In certain embodiments, a carrier may include fiber-specific or cable-specific markings (e.g., bar codes) printed, adhered, or otherwise disposed thereon.

Fiber optic modules of various types may be utilized in a fiber optic module arrays of structure fiber optic cabling systems as described herein. Exemplary embodiments of fiber optic modules are shown in FIGS. 10, 11A, 11C, and 12A-12B.

Figure 10:
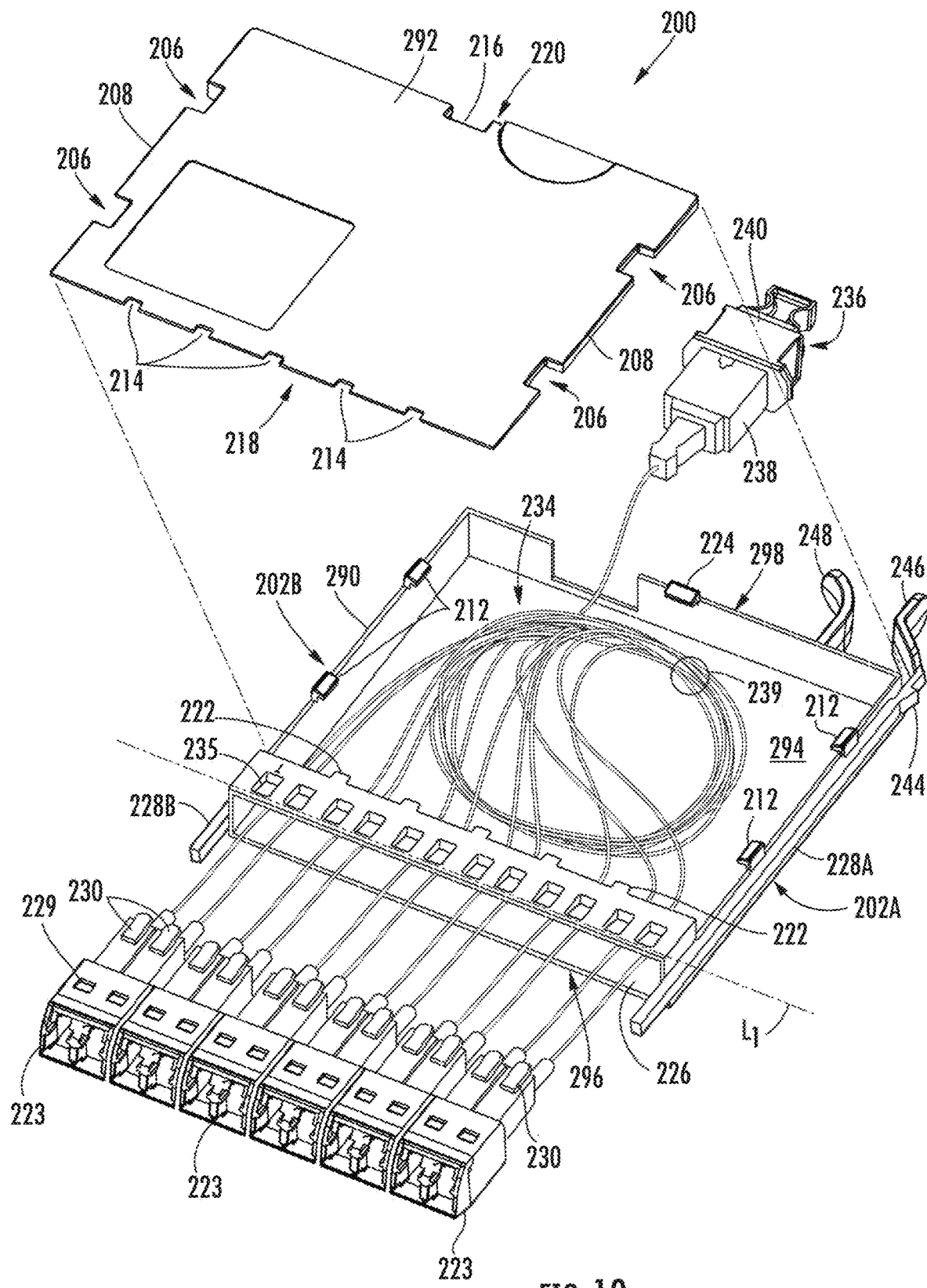
FIG. 10 is an exploded perspective view of a first fiber optic module including six duplex LC ports and a single MPO port arranged on opposing faces and connected by a plurality of optical fibers in an internal chamber of the fiber optic module.

FIG. 10 is an exploded view of a fiber optic module 200, with a cover 292 of the fiber optic module 200 removed to illustrate an internal chamber 294 and other internal components of the fiber optic module 200. The fiber optic module 200 includes a main body 290 configured to receive the cover 292. The internal chamber 294 disposed inside the main body 290 and the cover 292 and is configured to receive or retain optical fibers 239 and/or a fiber optic cable harness 234, as will be described in more detail below. The main body 290 is disposed between a front side 296 and a rear side 298 of the main body 290. Fiber optic components 223 can be disposed through the front side 296 of the main body 290 and configured to receive fiber optic connectors connected to fiber optic cables (not shown). In this example, the fiber optic components 223 are duplex LC fiber optic adapters that are configured to receive and support connections with duplex LC fiber optic connectors. However, any fiber optic connection type desired can be provided in the fiber optic module 200. The fiber optic components 223 are connected to a fiber optic component 236 disposed through the rear side 298 of the main body 290. In this manner, a connection to the fiber optic component 223 creates a fiber optic connection to the fiber optic component 236. In this example, the fiber optic component 236 is a multi-fiber MPO fiber optic adapter equipped to establish connections to multiple optical fibers (e.g., either twelve (12) or twenty-four (24) optical fibers). The fiber optic module 200 may also manage polarity between the fiber optic components 223, 236.

Module rails 228A, 228B are disposed on each lateral side 202A, 202B of the fiber optic module 200, and may be configured to be inserted into receiving structures (e.g., slots) of a chassis (not shown) that is mountable to a fiber optic equipment rack. In certain embodiments, when it is desired to install a fiber optic module 200 into a chassis (not shown), the front side 296 of the fiber optic module 200 can be inserted from either a front end or a rear end of the chassis. If the fiber optic module 200 is received by a chassis, to remove the fiber optic module 200 from the rear of the chassis, a latch 244 may be disengaged by pushing a lever 246 inward to release the latch 244 from a receiving structure of the chassis. To facilitate inward movement of the lever 246, a finger hook 248 is provided adjacent to the lever 246 so the lever 246 can easily be squeezed toward the finger hook 248 by a user's thumb and index finger.

The cover 292 includes lateral edges 208 defining notches 206 that are configured to interlock with protrusions 212 disposed on the lateral sides 202A, 202B of the main body 290 of the fiber optic modules 200 when the cover 292 is attached to the main body 290, to secure the cover 292 to the main body 290. The cover 292 also includes a front edge 218 and rear edge 220 defining notches 214, 216, respectively, that are configured to interlock with protrusions 222, 224 along the front side 296 and the rear side 298, respectively, of the main body 290 when the cover 292 is attached to the main body 290 to assist in securing the cover 292 to the main body 290.

With continuing reference to FIG. 10, the fiber optic components 223 are disposed through a front opening 226 disposed along a longitudinal axis Li in the front side 296 of the main body 290. In this embodiment, the fiber optic components 223 are duplex LC adapters 229, which support single or duplex fiber connections and connectors. The duplex LC adapters 229 in this embodiment contain protrusions 230 that are configured to engage with orifices 235 defined in a front upper surface of the main body 290 to secure the duplex LC adapters 229 in the main body 290 in this embodiment. A cable harness 234 is disposed in the internal chamber 294, with fiber optic connectors 236, 238 disposed on each end of optical fibers 239 connected to the duplex LC adapters 229 and the fiber optic component 236 disposed in the rear side 298 of the main body 290. The fiber optic component 236 in this embodiment is a twelve (12) fiber MPO fiber optic adapter 240. If desired, structures may be disposed in the internal chamber 294 of the main body 290 to retain the looping of the optical fibers 239 of the cable harness 234, wherein such structures and any spacing therebetween being designed to provide a bend radius in the optical fibers 239 of no greater than forty (40) mm, and preferably a bend radius of twenty-five (25) mm or less in this embodiment.

FIG. 11A is an upper perspective view of a second fiber optic module 300 including multiple fiber optic components in the form of adapter blocks 323 along a front side 326 of the fiber optic module 300. Six adapter blocks 323 are shown, with each adapter block 323 defining a front opening 330 and including three fiber optic ports 327 (e.g., MDC ports) each configured to receive a duplex MDC connector (such that each adapter block 323 may receive a total of six terminated optical fibers). A rear side 398 of the fiber optic module 300 includes two MPO ports 336A, 336B configured to receive first and second MPO connectors, respectively. The fiber optic module 300 further includes rails 328A, 328B extending from side wall portions, with one rail 328A including a protruding feature 345 that may be used to mate with a corresponding feature of a chassis for retention of the fiber optic module 300 within the chassis. Although the fiber optic module 300 is illustrated in an assembled configuration with a cover 392 obscuring the interior, it is to be appreciated that the fiber optic module 300 would include multiple optical fibers within an internal chamber extending between the MPO ports 336A, 336B disposed at the rear side 398 and the MDC ports 327 disposed at the front side 326.

FIG. 11B is a perspective view of a single duplex MDC connector 350 having a body structure 352 terminating at a front end 353, with first and second ferrules 355A, 355B protruding slightly forward relative to the front end 353. A rear end 354 of the MDC connector 350 is arranged to receive a two-fiber cable. The MDC connector 350 further includes a latch member 356 promoting engagement with a receiving structure such as the fiber optic ports 327 shown in FIG. 11A.

FIG. 11C is a perspective view of a front portion of a fiber optic module 300A substantially similar to the fiber optic module 300 of FIG. 11A, with seventeen MDC connectors 350A received by six adapter blocks 323A arranged along a front side of the fiber optic module 300A (i.e., with one adapter block 323A being capable of receiving another MDC connector as part of a total capacity of eighteen MDC connectors 350A for the fiber optic module 300A).

Figure 12A:
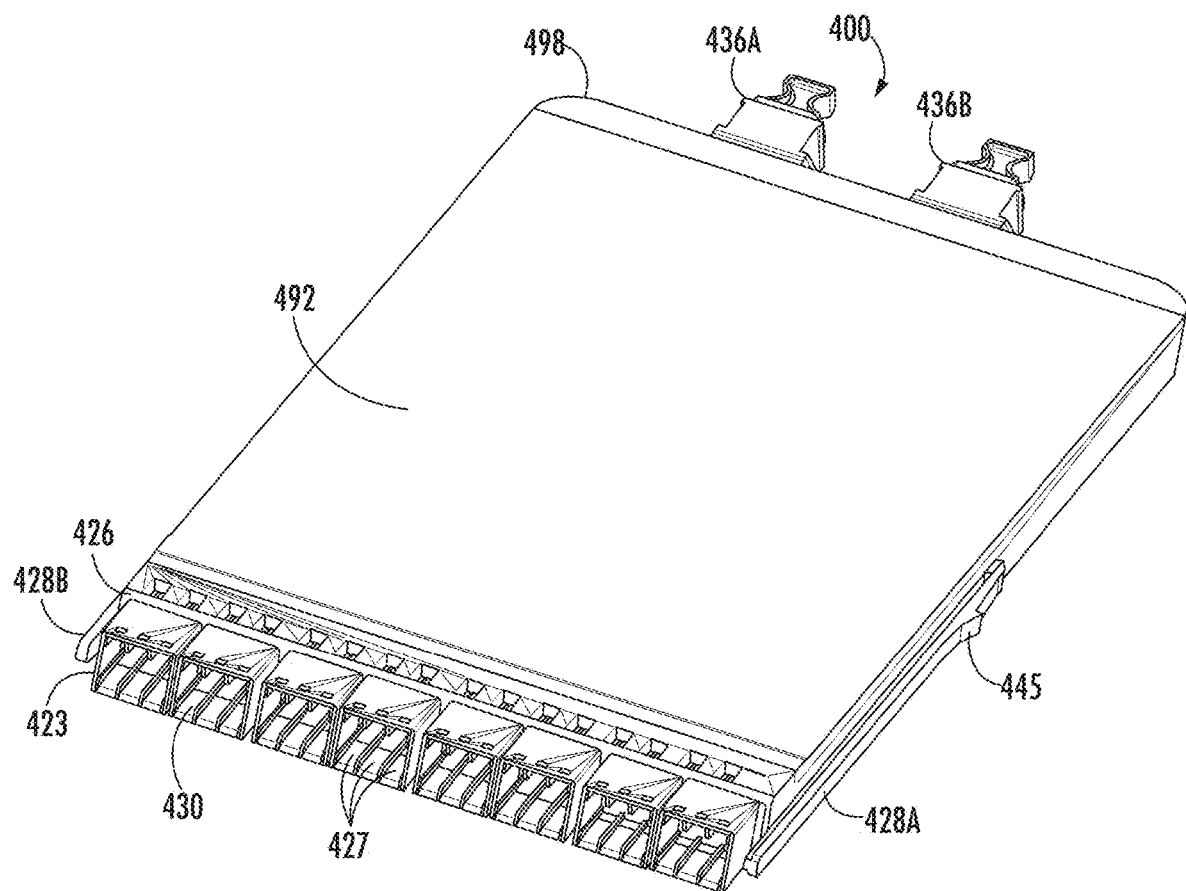
FIG. 12A is an upper perspective view of a third fiber optic module including eight adapter blocks along a front side, each configured to receive three duplex MDC connectors, and including two MPO ports along a rear side.

FIG. 12A is an upper perspective view of a third fiber optic module 400 including multiple fiber optic components in the form of adapter blocks 423 along a front side 426 of the fiber optic module 400. Eight adapter blocks 423 are shown, with each adapter block 423 defining a front opening 430 and including three fiber optic ports 427 (e.g., MDC ports) each configured to receive a duplex MDC connector, such that the fiber optic module 400 can accommodate a total of twenty-four duplex MDC connectors. A rear side 498 of the fiber optic module 400 includes two MPO ports 436A, 436B configured to receive first and second MPO connectors, respectively. In certain embodiments, each MPO port 436A, 436B is configured to receive a twenty-four fiber MPO connector. The fiber optic module 400 further includes rails 428A, 428B extending from side wall portions, with one rail 428A including a protruding feature 445 that may be used to mate with a corresponding feature of a chassis for retention of the fiber optic module 400 within the chassis. Although the fiber optic module 400 is illustrated in an assembled configuration with a cover 492 obscuring the interior, it is to be appreciated that the fiber optic module 400 would include multiple optical fibers within an internal cavity extending between the MPO ports 436A, 436B disposed at the rear side 498 and the MDC ports 427 disposed at the front side 426.

Figure 12B:
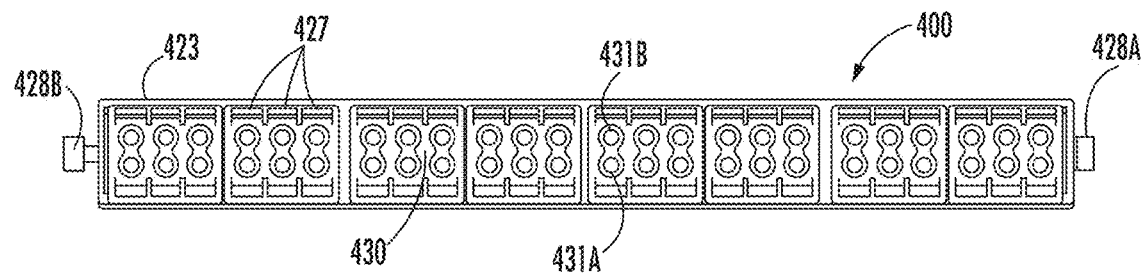
FIG. 12B is a front elevational view of the fiber optic module of FIG. 12A.

FIG. 12B is a front elevational view of the fiber optic module 400 of FIG. 12A, showing eight adapter blocks 423 each including a front opening 430 and three fiber optic ports 427 each configured to receive a MPO connector. Each fiber optic port 427 includes first and second terminated fibers 431A, 431B extending into the internal chamber of the fiber optic module 400. Although the fiber optic module 400 is shown in a horizontal orientation in FIG. 12B, it is to be appreciated that in use the fiber optic module 400 is intended to be oriented vertically within a chassis, with the rails 428A, 428B respectively arranged at the bottom or top of the fiber optic module 400.

Figure 13:
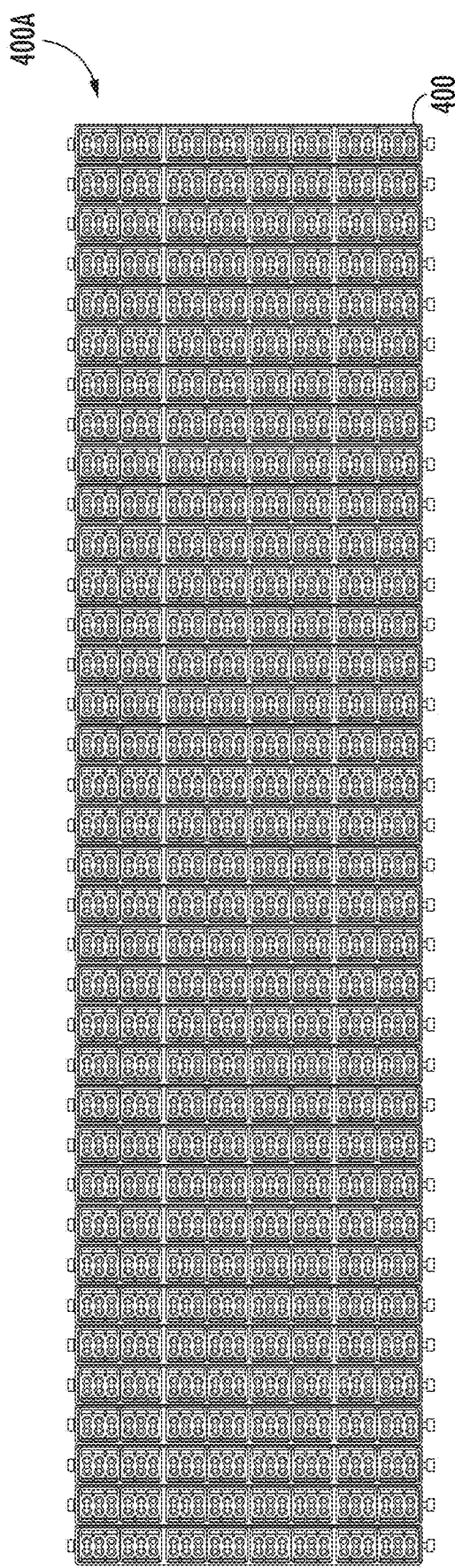
FIG. 13 is a front elevational view of an array of thirty-six fiber optic modules according to FIGS. 12A-12B, with the fiber optic modules being arranged vertically in a side-by-side configuration.

FIG. 13 is a front elevational view of an array 400A of thirty-six fiber optic modules 400 according to FIGS. 12A-12B, with the fiber optic modules 400 being arranged vertically in a side-by-side configuration. In certain embodiments, the fiber optic modules 400 are configured to be received by a rack-mountable chassis, such as described in connection with FIG. 14.

Figure 14:
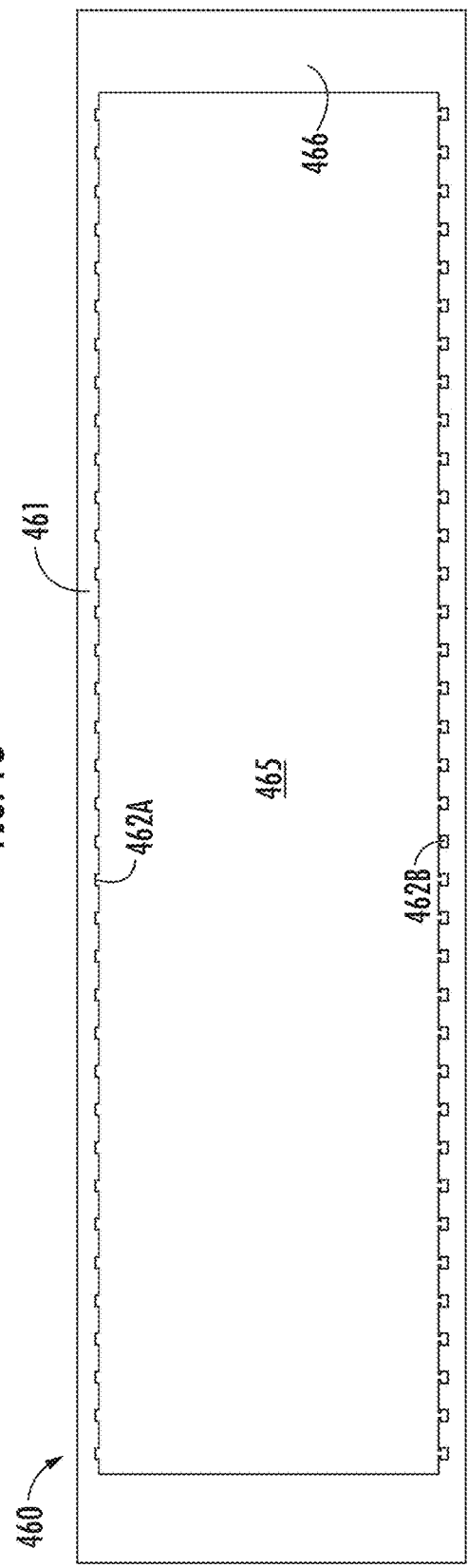
FIG. 14 is a front elevational view of a rack-mountable chassis defining an aperture and slots configured to receive the array of fiber optic modules of FIG. 13.

FIG. 14 is a front elevational view of a rack-mountable chassis 460 defining an aperture 465 that is bounded by a top wall 461, a bottom wall 463, and side flanges 466. The side flanges 466 may be used for mounting the chassis 460 to a fiber optic equipment rack (not shown). The chassis includes slots 462A, 462B defined in the top and bottom walls 461, 463, respectively, for receiving rails 428A, 428B (not shown) of the fiber optic modules 400. The The chassis 460 is configured to receive the array 400A of fiber optic modules 400 of FIG. 13 within the aperture 465. Although not shown, in certain embodiments, vertical partition walls may be arranged within the chassis 460 between at least some modules of the array 400A of fiber optic modules 400.

FIG. 15 is a simplified top view of a portion of a fiber optic jumper assembly 500 useable with the array 400A of fiber optic modules 400 of FIG. 13. The fiber optic jumper assembly 500 includes a horizontal segment 502 (including multiple jumpers sections extending parallel) with thirty-six legs 503 that emanate from the horizontal segment 502 and that are terminated by a corresponding group of thirty-six connectors 504.

FIG. 16A is a front elevational view of a connector positioning guide member 510 having a body 512 and thirty-six apertures 514 configured for use with the fiber optic jumper assembly 500 of FIG. 15 to maintain positioning of the connectors 504 of the fiber optic jumper assembly 500 in linear order. Maintenance of ordered positioning of the connectors 504 is beneficial to facilitate interconnection between the fiber optic jumper assembly 500 and an array 400A of fiber optic modules 400 as shown in FIG. 13. FIG. 16B is a top plan view of the body 512 of the connector positioning guide member 510. FIG. 16C is a magnified front elevational view of a portion of the connector positioning guide member 510 of FIG. 16A. As shown, each aperture 514 may be defined along a center of the body 512, with each aperture 514 having a slit or narrowed portion 505 extending to an edge of the body 512. In certain embodiments, legs of a fiber optic jumper assembly may be inserted through the slits 515. In certain embodiments, each aperture 514 may be configured to directly engage an outer portion of a connector of a fiber optic jumper assembly. In certain embodiments, a distance 516 between adjacent apertures 514 may be substantially equal to a center-to-center lateral pitch between adjacent fiber optic modules within an array of fiber optic modules (e.g., between fiber optic modules 400 within the array 400A of fiber optic modules 400 shown in FIG. 13). In certain embodiments, the body 512 may be formed of a suitably rigid plastic, a composite, or metal by any appropriate method such as molding, stamping, die cutting, laser cutting, waterjet cutting or the like. In certain embodiments, a fiber optic jumper assembly 500 may be manufactured (and optionally packaged) with a connector positioning guide member to maintain positioning of the connectors 504 of the fiber optic jumper assembly 500 in linear order, with the resulting fiber optic jumper assembly 500 being shipped to a customer or service provider for installation in a datacenter. In certain embodiments, the connector positioning guide member 510 may include fiber-specific or cable-specific markings (e.g., bar codes) printed or adhered thereon, optionally positioned proximate to the apertures 514.

Figure 17:
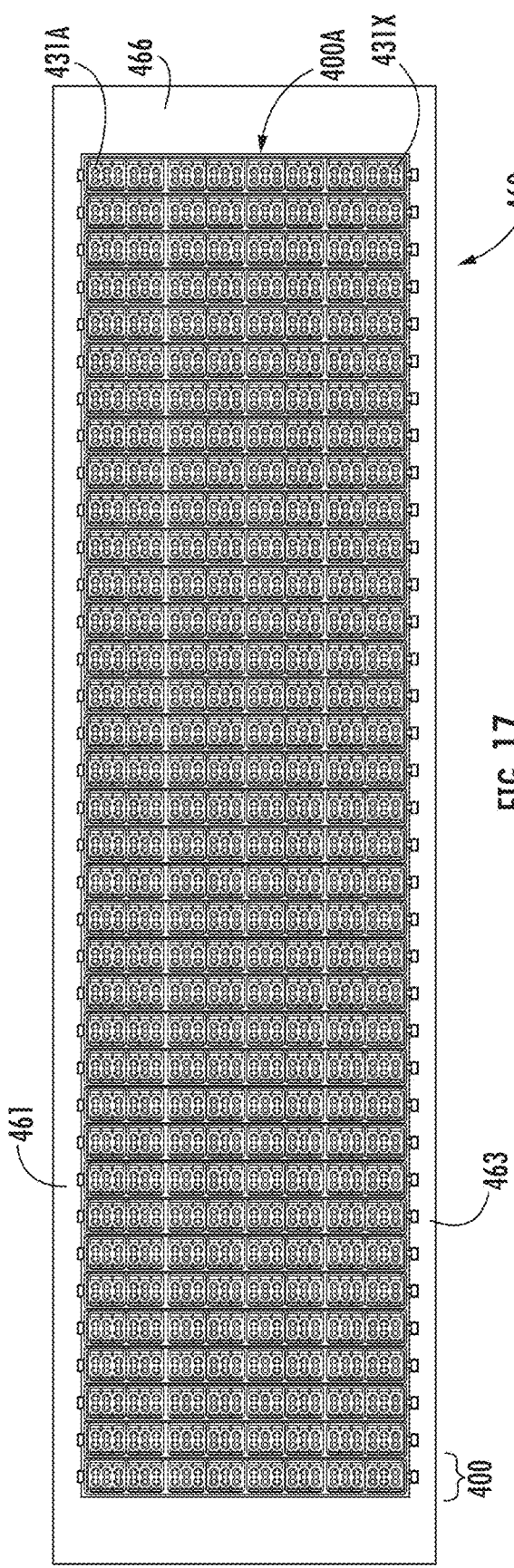
FIG. 17 is a front elevational view of the array of thirty-six fiber optic modules of FIG. 13 received within the aperture and slots of the rack-mountable chassis of FIG. 14.

FIG. 17 is a front elevational view of the array 400A of thirty-six fiber optic modules 400 of FIG. 13 received within the aperture 465 and slots 462A, 462B of the rack-mountable chassis 460 of FIG. 14. As shown, the fiber optic modules 400 are arranged vertically in a side-by-side configuration, with each having fiber optic ports 431A-431X (e.g., duplex MDC ports) along a front side distributed in a vertical direction. In particular, first fiber optic ports 431A of the respective fiber optic modules 400 are arranged at a first vertical position (i.e., aligned along a first horizontal plane), the second fiber optic ports of each fiber optic module 400 are arranged at a second vertical position (i.e., aligned along a second horizontal plane), and so on, with the twenty-fourth fiber optic ports 431X of the respective fiber optic modules 400 being arranged at a twenty-fourth vertical position (i.e., aligned along a twenty-fourth horizontal plane).

Figure 18:
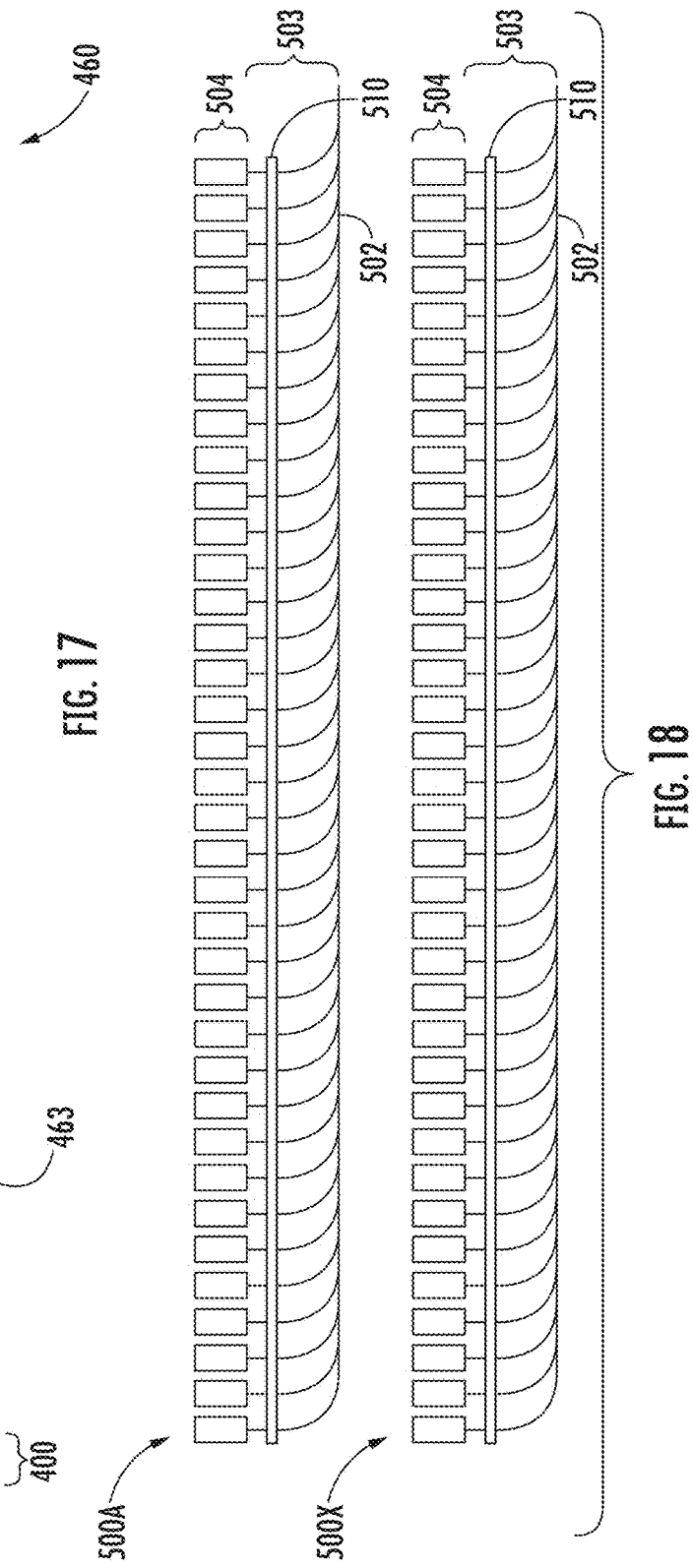
FIG. 18 is a top plan view of two fiber optic jumper assemblies each according to FIG. 15 and each further including a connector positioning guide member according to FIGS. 16A-16C to maintain positioning of the connectors in a linear order.

FIG. 18 is a top plan view of two fiber optic jumper assemblies 500A, 500X each according to FIG. 15 with each further including a connector positioning guide member 510 according to FIGS. 16A-16C to maintain positioning of the connectors 504 in a linear order. Upon assembly, one fiber optic jumper assembly 500A includes connectors 504 that may be received by the first fiber optic ports 431A of the respective fiber optic modules 400 within the array 400A, and the other fiber optic jumper assembly 500X includes connectors 504 that may be received by the twenty-fourth fiber optic ports 431X of the respective fiber optic modules 400 within the array 400A. It is to be appreciated that twenty-four fiber optic jumper assemblies 500A-500X of the type shown in FIG. 18 may be coupled to the array 400A of fiber optic modules 400 of FIG. 13.

Those skilled in the art will appreciate that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. A structured fiber optic cabling system configured to connect first and second layers of switches in a mesh network, the structured fiber optic cabling system comprising:
    a chassis configured to be disposed in an equipment rack;
    a plurality of fiber optic modules configured to be installed in the chassis in a side-by-side configuration, wherein each fiber optic module of the plurality of fiber optic modules comprises a first location comprising a plurality of first fiber optic ports, a second location comprising at least one second fiber optic port, a main body defining an internal chamber between the first location and the second location, and a plurality of optical fibers disposed within the internal chamber and arranged to establish optical connections between the at least one second fiber optic port and the plurality of first fiber optic ports, wherein for each fiber optic module, first fiber optic ports of the plurality of first fiber optic ports are distributed in a vertical direction when the fiber optic module is installed in the chassis; and
    a plurality of fiber optic jumper assemblies configured to connect the plurality of fiber optic modules to a plurality of second layer switches;
    wherein when the plurality of fiber optic modules are installed in the chassis and when the fiber optic jumper assembly connects the plurality of fiber optic modules to the plurality of second layer switches:
        each fiber optic jumper assembly includes a segment extending in a horizontal direction proximate to the plurality of first fiber optic ports,
        each fiber optic jumper assembly includes a plurality of legs and a plurality of fiber optic connectors that respectively terminate the plurality of legs, and
        each fiber optic connector of the plurality of fiber optic connectors is connected to a corresponding fiber optic port of the plurality of first fiber optic ports at the same vertical location in each fiber optic module of the plurality of fiber optic modules.

2. The structured fiber optic cabling system of claim 1, wherein each fiber optic module of the plurality of fiber optic modules comprises a first side and a second side that opposes the first side, the first location comprises the first side, and the second location comprises the second side.

3. The structured fiber optic cabling system of claim 1, wherein each first fiber optic port of the plurality of first fiber optic ports comprises a duplex fiber optic port.

4. The structured fiber optic cabling system of claim 2, wherein each first fiber optic port of the plurality of first fiber optic ports comprises a dual-ferrule very small form factor adapter port or an LC adapter port.

5. The structured fiber optic cabling system of claim 4, wherein the at least one second fiber optic port comprises at least one MPO adapter port.

6. The structured fiber optic cabling system of claim 5, further comprising at least one trunk cable coupled to the at least one second fiber optic port and configured to connect the plurality of fiber optic modules to at least one first layer switch.

7. The structured fiber optic cabling system of claim 6, further comprising a breakout cable or fanout assembly arranged between the at least one trunk cable and the at least one first layer switch.

8. The structured fiber optic cabling system of claim 1, wherein each fiber optic jumper assembly comprises a connector positioning guide member configured to receive at least one of the plurality of legs or the plurality of fiber optic connectors, and configured to maintain positioning of the plurality of fiber optic connectors in a linear order.

9. The structured fiber optic cabling system of claim 8, wherein the connector positioning guide member defines a plurality of openings configured to retain at least one of the plurality of legs or the plurality of fiber optic connectors, wherein adjacent openings of the plurality of openings are spaced apart by a distance substantially equal to a center-to-center lateral pitch between adjacent fiber optic modules of the plurality of fiber optic modules.

10. The structured fiber optic cabling system of claim 1, wherein the chassis defines a plurality of slots configured to receive the plurality of fiber optic modules.

11. The structured fiber optic cabling system of claim 1, wherein the chassis occupies no more than a 4-U space, and wherein a U space comprises a height of 1.75 inches and comprises a width of 19 inches or 23 inches.

12. The structured fiber optic cabling system of claim 1, wherein the plurality of fiber optic modules comprises twenty-four or thirty-six fiber optic modules.

13. A structured fiber optic cabling system connecting a plurality of first layer switches and a plurality of second layer of switches in a mesh network, the structured fiber optic cabling system comprising:
    a chassis;
    a plurality of fiber optic modules installed in the chassis in a side-by-side configuration, wherein each fiber optic module of the plurality of fiber optic modules comprises a first location comprising a plurality of first fiber optic ports, a second location comprising at least one second fiber optic port, a main body defining an internal chamber between the first location and the second location, and a plurality of optical fibers disposed within the internal chamber and arranged to establish optical connections between the at least one second fiber optic ports and the plurality of first fiber optic ports, wherein for each fiber optic module the plurality of first fiber optic ports are distributed in a vertical direction; and
    a plurality of fiber optic jumper assemblies connecting the plurality of fiber optic modules to a plurality of second layer switches;
    wherein:

each fiber optic jumper assembly includes a segment extending in a horizontal direction proximate to the plurality of first fiber optic ports, each fiber optic jumper assembly includes a plurality of legs extending from the segment and a plurality of fiber optic connectors that respectively terminate the plurality of legs, and each fiber optic connector of the plurality of fiber optic connectors is connected to a corresponding fiber optic port of the plurality of first fiber optic ports at the same vertical location in each fiber optic module of the plurality of fiber optic modules.

14. The structured fiber optic cabling system of claim 13, wherein each fiber optic module of the plurality of fiber optic modules comprises a first side and a second side that opposes the first side, the first location comprises the first side, and the second location comprises the second side.

15. The structured fiber optic cabling system of claim 14, wherein each first fiber optic port of the plurality of first fiber optic ports comprises a dual-ferrule very small form factor adapter port or an LC adapter port, and wherein the at least one second fiber optic port comprises at least one MPO adapter port.

16. The structured fiber optic cabling system of claim 15, further comprising at least one trunk cable coupled to the at least one second fiber optic port and configured to connect the plurality of fiber optic modules to at least one first layer switch.

17. The structured fiber optic cabling system of claim 16, further comprising a breakout cable or fanout assembly arranged between the at least one trunk cable and the at least one first layer switch.

18. The structured fiber optic cabling system of claim 1, wherein each fiber optic jumper assembly comprises a connector positioning guide member configured to receive at least one of the plurality of legs or the plurality of fiber optic connectors, and configured to maintain positioning of the plurality of fiber optic connectors in a linear order.

19. The structured fiber optic cabling system of claim 8, wherein the connector positioning guide member defines a plurality of openings configured to retain at least one of the plurality of legs or the plurality of fiber optic connectors, wherein adjacent openings of the plurality of openings are spaced apart by a distance substantially equal to a center-to-center lateral pitch between adjacent fiber optic modules of the plurality of fiber optic modules.

20. A method of installing a structured fiber optic cabling system that connects a plurality of first layer switches and a plurality of second layer of switches in a mesh network, the method comprising:

installing a plurality of fiber optic modules a chassis in a side-by-side configuration, wherein each fiber optic module of the plurality of fiber optic modules comprises a first location comprising a plurality of first fiber optic ports, a second location comprising at least one second fiber optic port, a main body defining an internal chamber between the first location and the second location, and a plurality of optical fibers disposed within the internal chamber and arranged to establish optical connections between the at least one second fiber optic ports and the plurality of first fiber optic ports, wherein for each fiber optic module the plurality of first fiber optic ports are distributed in a vertical direction; and connecting the plurality of fiber optic modules to a plurality of second layer switches using a plurality of fiber optic jumper assemblies;

wherein:
each fiber optic jumper assembly includes a segment extending in a horizontal direction proximate to the plurality of first fiber optic ports, each fiber optic jumper assembly includes a plurality of legs extending from the segment and a plurality of fiber optic connectors that respectively terminate the plurality of legs, and each fiber optic connector of the plurality of fiber optic connectors is connected to a corresponding fiber optic port of the plurality of first fiber optic ports at the same vertical location in each fiber optic module of the plurality of fiber optic modules.

* * * * *